United States Patent Office 3,272,872
Patented Sept. 13, 1966

3,272,872
HALOGENATED 1,4:5,8-DIMETHANOANTHRA-
HYDROQUINONES
Daniel S. Raden, Chicago, Ill., assignor to Velsicol Chemical Corporation, Chicago, Ill., a corporation of Illinois
No Drawing. Filed Apr. 16, 1962, Ser. No. 187,955
11 Claims. (Cl. 260—617)

This invention relates to new halogenated anthrahydroquinone products. More particularly, this invention relates to new halogenated anthrahydroquinone products, having the structural formula

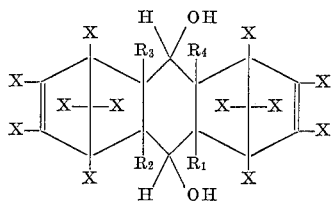

wherein each X is independently selected from the group consisting of chlorine and bromine; and $R_1$, $R_2$, $R_3$, and $R_4$ are independently selected from the group consisting of hydrogen, chlorine, bromine, and alkyl groups of from 1 to 3 carbon atoms. These new compounds will hereinafter be referred to as the "anthrahydroquinone products."

The compounds of the present invention can be readily prepared, for example, by the reduction of the keto groups of the corresponding Diels-Alder addition product of a hexahalocyclopentadiene and a quinone, having the structural formula:

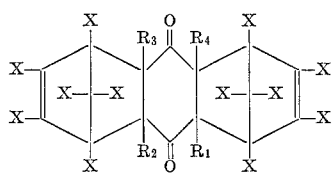

wherein X and $R_1$–$R_4$ are as described above. The Diels-Alder addition products described above will hereinafter be referred to as the "2:1" adducts.

The reduction of the keto groups to hydroxyl groups can be readily accomplished, for example, by a catalytic hydrogenation or by the action of reducing agents, such as lithium aluminum hydride. Catalytic hydrogenation can be carried out by contacting the corresponding 2:1 adduct with gaseous hydrogen in the presence of a hydrogenation catalyst, such as a metal of group 8 of the periodic table, particularly activated nicked, platium and palladium. These metals are preferably finely divided to increase their surface area, and used as such, or can be deposited on a suitable carrier, such as charcoal, barium sulfate, kieselguhr, and the like. In addition, active derivatives of the metal can be employed, for example, platinum oxide.

While the hydrogenation proceeds satisfactorily at room temperature with a positive hydrogen pressure, it is preferred to warm the 2:1 adduct and utilize a hydrogen pressure in the order of 50–200 pounds per square inch for more rapid hydrogenation. Although the 2:1 adduct can be hydrogenated without a diluent or solvent, it is preferred to add a convenient amount of a suitable solvent or diluent to aid in the control of the reaction. The lower aliphatic alcohols, acetone, and methyl Cellosolve have been found to be excellent for this purpose.

After the hydrogenation has been completed the hydrogenation catalyst is removed from the reaction solution in a manner dependent upon the physical characteristics of the catalyst. For example, when finely ground metal deposited on a small particle carrier is utilized, the catalyst will normally settle to the bottom of the reactor and the supernatant liquid can be separated by decantation. Other catalysts, which remain suspended, can usually be removed by filtration.

The 2:1 adducts described above can readily be prepared, for example, by heating a hexahalocyclopentadiene reactant with a suitable quinone in a molar proportion of at least 2:1, and preferably in a molar proportion of greater than 2:1, at a temperature of from about 250° C. to about 300° C. The preparation is preferably performed in an excess of the hexahalocyclopentadiene reactant, wherein the excess reactant serves as a diluent, providing ease of operation and aiding in the control of the reaction temperature. The reaction can also be carried out in the presence of a high boiling solvent or diluent, such as diphenyl ether, and the like.

Alternatively, the 2:1 adducts can be prepared by heating the equimolecular Diels-Alder addition product of a hexahalocyclopentadiene and a benzoquinone, i.e., the "1:1 adduct," with at least an equimolar amount of a suitable hexahalocyclopentadiene, at a temperature of from about 250° C. to about 300° C. This alternative method of preparation is preferred where the two hexahalocyclopentenyl portions of the 2:1 adducts and their corresponding "anthrahydroquinone products" contain different arrangements of halogen atoms; i.e. different species and placement of the halogen atoms. Thus, such a 2:1 adduct can be readily prepared by reacting, as described above, the proper 1:1 adduct having a hexahalocyclopentenyl portion having one arrangement of halogen atoms with a hexahalocyclopentadiene having a different arrangement of halogen atoms.

The suitable hexahalocyclopentadienes for use as the diene reactant may contain only one species of halogen substituent, e.g. hexachlorocyclopentodiene and hexa bromocyclopentadiene; or may contain both chlorine and ents, for example, chloropentabromocyclopentadiene, dibromine substituents, for example, chloropentabromocyclopentadiene, dibromotetrachlorocyclopentadiene, and the like. These compounds are either commercially available or can be prepared readily by those skilled in the art, as for example, by the halogenation of cyclopentadiene under various conditions.

Quinones which are suitable for use as the dienophile in the preparation of the 2:1 adducts are the benzoquinones, and preferably the benzoquinones having the structural formula

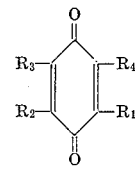

wherein $R_1$, $R_2$, $R_3$ and $R_4$ are independently selected from the group consisting of hydrogen, chlorine, bromine, and alkyl groups of from 1 to 3 carbon atoms. Exemplary of the preferred benzoquinones are: benzoquinone, toluquinone, chlorobenzoquinone, 2,5-dichlorobenzoquinone, 2,3-dichlorobenzoquinone, 2,6-dichlorobenzoquinone, chloranil o-xyloquinone, p-xyloquinone, 2,6-dimethylbenzoquinone, p-thymoquinone, and the like.

The compounds of the present invention having the previously described structural formula, and which can be prepared by the procedure described above, are exemplified by:

1,2,3,4,5,6,7,8,11,11,12,12-dodecachloro-1,4,4a,5,8,8a,9a,
  10a-octahydro-1,4:5,8-dimethanoanthrahydroquinone;
1,2,3,4,5,6,7,8,11,11,12,12-dodecabromo-1,4,4a,5,8,8a,9a,
  10a-octahydro-1,4:5,8-dimethanoanthrahydroquinone;

1,2,3,4,5,6,7,8,11,11,12,12-dodecachloro-4a-methyl-1,4,
4a,5,8,8a,9a,10a-octahydro-1,4:5,8-dimethanoanthra-
hydroquinone;

1,2,3,4,4a,5,6,7,8,8a,11,11,12,12-tetradecachloro-1,4,4a,5,
8,8a,9a,10a-octahydro-1,4:5,8-dimethanoanthrahydro-
quinone;

1,2,3,4,4a,5,6,7,8,9a,11,11,12,12-tetradecachloro-1,4,4a,5,
8,8a,9a,10a-octahydro-1,4:5,8-dimethanoanthrahydro-
quinone;

1,2,3,4,5,6,7,8,11,11,12,12-dodecachloro-4a,9a-dimethyl-
1,4,4a,5,8,8a,9a,10a-octahydro-1,4,5,8-dimethanoan-
thrahydroquinone;

1,2,3,4,4a,5,6,7,8,10a,11,11,12,12-tetradecachloro-1,4,4a,
5,8,8a,9a,10a-octahydro-1,4:5,8-dimethanoanthrahy-
droquinone;

1,2,3,4,5,6,7,8,11,11,12,12-dodecachloro-4a,10a-dimethyl-
1,4,4a,5,8,8a,9a,10a-octahydro-1,4:5,8-dimethanoan-
thrahydroquinone;
and the like.

The following examples are set forth to illustrate the preparation of the 2:1 adducts. In each example there can be substituted for the hexahalocyclopentadiene and the quinone reactants other previously described hexahalocyclopentadienes and quinones.

*Example 1.—Preparation of 1,2,3,4,5,6,7,8,11,11,12,12-dodecachloro - 1,4,4a,5,8,8a,9a,10a - octahydro - 1,4:5,8-dimethano-9,10-anthraquinone*

Hexachlorocyclopentadiene (1384 gms.; 5 moles) and benzoquinone (108 gms.; 1 mol) are placed in a 2-liter, three necked, round-bottom flask equipped with a mechanical stirrer, internal thermometer, reflux condenser and heating mantle. The mixture is stirred and heated at about 260° C. for about two hours. After cooling to normal room temperature, the apparatus is modified for distillation in vacuo and excess hexachlorocyclopentadiene is removed by distillation to an overhead temperature of 75–84° C. at 1.5–2.0 mm. mercury pressure. Upon cooling to normal room temperature the residue is dissolved in acetone and decolorized with activated charcoal. The acetone is removed by distillation on a steam bath, and the residue recrystallized several times from benzene to yield the 2:1 adduct. 1,2,3,4,5,6,7,8,11,11,12,12-dodecachloro-1,4,4a,5,8,8a,9a,10a - octahydro - 1,4:5,8-dimethano-9,10-anthraquinone, thus prepared is a cream colored to yellow solid melting at 212–213° C.

*Example 2.—Preparation of 1,2,3,4,5,6,7,8,11,11,12,12-dodecabromo - 1,4,4a,5,8,8a,9a,10a - octahydro-1,4:5,8-dimethano-9,10-anthraquinone*

Hexabromocyclopentadiene (2700 gms.; 5 moles) and benzoquinone (108 gms.; 1 mol) are reacted in the manner detailed in the previous example to obtain 1,2,3,4,5,6,7,8,11,11,12,12 - dodecabromo - 1,4,4a,5,8,8a,9a,10a-octahydro-1,4:5,8-dimethano-9,10-anthraquinone as the solid residue after removal of excess hexabromocyclopentadiene and recrystallization from benzene.

*Example 3.—Preparation of 1,2,3,4,5,6,7,8,11,11,12,12-dodecachloro - 1,4,4a,5,8,8a,9a,10a - octahydro-1,4:5,8-dimethano-9,10-anthraquinone in the presence of a solvent*

Hexachlorocyclopentadiene (50 gms.; 0.18 mol), benzoquinone (10 gms.; 0.09 mol) and diphenyl ether (35 ml.) are charged to a 100 ml. three-necked round-bottom flask fitted with a mechanical stirrer, internal thermometer, reflux condenser and heating mantle. The mixture is heated at reflux for about 2 hours with stirring. Thereafter the solvent is removed by distillation in vacuo, and the residue recrystallized from benzene to recover the desired 2:1 adduct as a yellow to cream colored solid.

The following examples are presented to illustrate the preparation of the compounds of the present invention which is not strictly limited thereto, but in each example there can be substituted for the 2:1 adduct other previously described 2:1 adducts falling within the scope of this invention.

*Example 4.—Preparation of 1,2,3,4,5,6,7,8,11,11,12,12-dodecachloro - 1,4,4a,5,8,8a,9a,10a - octahydro-1,4:5,8-dimethanoanthrahydroquinone*

1,2,3,4,5,6,7,8,11,11,12,12 - dodecachloro - 1,4,4a,5,8,8a,9a,10a - octahydro - 1,4:5,8-dimethano-9,10-anthraquinone (30 gms.; 0.046 mol), prepared as in Example 1, methyl Cellosolve (150 ml.), methanol (25 ml.), and acetone (35 ml.) were placed into a 350 ml. glass pressure bottle. To this mixture platinum oxide catalyst (0.25 gm.) was added. The bottle was stoppered, placed in a Parr mechanical rocking apparatus, evacuated of air, flushed several times with hydrogen and pressured to 44.5 pounds per square inch with the gas. The bottle was rocked by the apparatus over a period of 21¼ hours. At the end of this time, the bottle was unstoppered and the contents were filtered through diatomaceous earth. Solvent was removed from the filtrate by distillation in vacuo on a steam bath to recover the dihydroxy product as a white solid which turned yellow on standing, and had the following hydroxyl and elemental analysis.

Calculated for $C_{16}H_8Cl_{12}O_2$: Theoretical, percent: C, 29.22; H, 1.23; Cl, 64.69; hydroxyl content 5.19. Found, percent: C, 29.39; H, 0.72; Cl, 64.63; hydroxyl content, 4.80.

*Example 5.—Preparation of 1,2,3,4,5,6,7,8,11,11,12,12-dodecachloro - 1,4,4a,5,8,8a,9a,10a, - octahydro - 1,4:5, 8 - dimetranoanthrahydroquinone*

Into a 500 ml., three necked, round-bottom flask fitted with a mechanical stirrer, dropping funnel, internal thermometer and water-cooled reflux condenser topped by a calcium chloride drying tube, were placed anhydrous diethyl ether (200 ml.) and lithium aluminum hydride (1.5 gms.). A solution of the 2:1 adduct product of Example 1 (32.7 gms.) in diethyl ether (200 ml.) and tetrahydrofuran (25 ml.) was prepared and placed in the dropping funnel. The stirrer was started and the 2:1 adduct solution added dropwise to the flask over a period of about an hour at a reaction temperature of 31°–33° C. After the addition was complete the reaction mixture was refluxed for about one-half hour. Unreacted lithium aluminum hydride was destroyed and hydrolysis accomplished by the successive addition of small portions (about 25 ml. each) of ethyl acetate, water, and 50% aqueous hydrochloric acid. The ethereal layer was separated, washed several times with water followed by saturated aqueous sodium bicarbonate solution and then water until the wash water was neutral to pH indicator paper, and dried over anhydrous sodium sulfate. The organic solution was filtered free of drying agent and the solvent removed by heating on a stream bath to yield a light tan solid, which was dried in a vacuum oven for one hour at 60° C. The yield was 95% of theoretical. An infrared scan of the pulverized product as a paste with a drop of mineral oil showed a peak at 3.05 microns (the hydroxyl region) and no bands in the 5.0–6.3 micron range (the carbonyl group region).

*Example 6.—Preparation of 1,2,3,4,5,6,7,8,11,11,12,12-dodecabromo - 1,4,4a,5,8,8a,9a,10a - octahydro - 1,4:5, 8 - dimetranoanthrahydroquinone*

A solution of the product of Example 2 (59.4 gms.) in diethyl ether (250 ml.) and tetrahydrofuran (25 ml.) is added dropwise to the lithium aluminum hydride solution described in the previous example, in the apparatus also described therein. After the addition is complete, the reaction mixture is refluxed for about 2 hours. Unreacted hydride is destroyed and the intermediate complex is hydrolyzed by the successive addition of small portions (about 25 ml. each) of ethyl acetate, water and 50% aqueous hydrochloric acid. The ethereal solution is separated, washed stripped of solvent and dried as described in the previous example to recover the desired anthrahydroquinone product.

Other compounds within the scope of the present invention having the aforesaid structural formula can be prepared in the manner detailed in the previous examples. Given in Examples 7–12 are the reactants required to prepare the 2:1 adduct, which is then reduced to the indicated named compounds of this invention. In each example H designates reduction by hydrogenation, although other methods can be used with equal success.

*Example 7*

Hexachlorocyclopentadiene+chlorobenzoquinone+H= 1,2,3,4,4a,5,6,7,8,11,11,12,12 - tridecachloro - 1,4,4a,5,8, 8a,9a,10a - octahydro - 1,4:5,8 - dimethanoanthrahydroquinone.

*Example 8*

Hexachlorocyclopentadiene+toluquinone+H=1,2,3,4, 5,6,7,8,11,11,12,12 - dodecachloro - 4a - methyl - 1,4,4a,5, 8,8a,9a,10a - octahydro - 1,4:5,8 - dimethanoanthrahydroquinone.

*Example 9*

Hexachlorocyclopentadiene+p-xyloquinone+H=1,2,3, 4,5,6,7,8,11,11,12,12 - dodecachloro - 4a,8a - dimethyl - 1, 4,4a,5,8,8a,9a,10a-octahydro - 1,4:5,8 - dimethanoanthrahydroquinone.

*Example 10*

Hexabromocyclopentadiene+2,5-dichlorobenzoquinone +H=1,2,3,4,5,6,7,8,11,11,12,12 - dodecabromo - 4a,8a-dichloro - 1,4,4a,5,8,8a,9a,10a - octahydro - 1,4:5,8 - dimethanoanthrahydroquinone.

*Example 11*

Hexachlorocyclopentadiene+p-thymoquinone+H=1,2, 3,4,5,6,7,8,11,11,12,12 - dodecachloro - 4a - methyl - 8a-isopropyl - 1,4,4a,5,8,8a,9a,10a - octahydro - 1,4:5,8 - dimethanoanthrahydroquinone.

*Example 12*

Hexachlorocyclopentadiene+chloranil+H=1,2,3,4,4a, 5,6,7,8,8a,9a,10a,11,11,12,12 - hexadecachloro - 1,4,4a,5, 8,8a,9a,10a - octahydro - 1,4:5,8 - dimethanoanthrahydroquinone.

The new compounds of the present invention have many applications in various areas, particularly in industry and agriculture. For example, the compounds of this invention are especially useful as intermediates in the preparation of plasticizers for polyvinyl resins, and the like.

Plasticizers can be readily prepared from the compounds of this invention, for example, by esterifying the hydroxyl groups with long chain fatty acids to obtain the plasticizer product. The materials thus produced can be used to plasticize polyvinyl resins by methods common to the art, for example, by adding the plasticizer to the resin during the cure. Esterification of the dihydroxyl derivative with suitable fatty acids can be carried out by methods common to the art. Among the suitable long chain fatty acids which can be used in the esterification step to form these plasticizers are: lauric acid, myristic acid, oleic acid, palmitic acid, stearic acid, and the like.

The following example illustrates the preparation of plasticizers from the new compounds of the present invention. Although 1,2,3,4,5,6,7,8,11,11,12,12 - dodecachloro - 1,4,4a,5,8,8a,9a,10a - octahydro - 1,4:5,8 - dimethanoanthrahydroquinone is utilized in this example, the other compounds of this invention can be substituted therefor with equally successful results.

*Example 13.—Preparation of a plasticizer*

Lauric acid (0.35 mol), the product of Example 4 (0.25 mol), and toluene (500 ml.) are placed with para-toluene-sulfonic acid (1 gm.) in a one-liter, three-necked, round-bottom flask fitted with a mechanical stirrer, and a reflux condenser equipped with a Dean-Stark trap. The contents are stirred and heated at reflux while water is collected in the Dean-Stark trap from the azeotroping solvent mixture. The refluxing is continued until water no longer collects in the trap. Thereafter, the solvent and excess lauric acid are removed by distillation in vacuo, leaving the ester as the residue. This ester is the desired plasticizer.

I claim:
1. A compound of the formula:

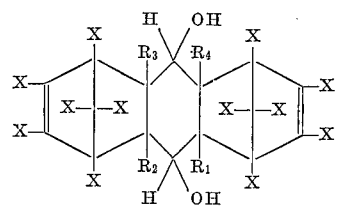

wherein each X is independently selected from the group consisting of chlorine and bromine; and $R_1$, $R_2$, $R_3$, and $R_4$ are independently selected from the group consisting of hydrogen, chlorine, bromine, and alkyl radicals of from 1 to 3 carbon atoms.

2. 1,2,3,4,5,6,7,8,11,11,12,12-dodecachloro-
1,4,4a,5,8,8a,9a,10a-octahydro-1,4:5,8-
dimethanoanthrahydroquinone.
3. 1,2,3,4,5,6,7,8,11,11,12,12-dodecabromo-
1,4,4a,5,8,8a,9a,10a-octahydro-1,4:5,8-
dimethanoanthrahydroquinone.
4. 1,2,3,4,4a,5,6,7,8,11,11,12,12-tridecachloro-
1,4,4a,5,8,8a,9a,10a-octahydro-1,4:5,8-
dimethanoanthrahydroquinone.
5. 1,2,3,4,5,6,7,8,11,11,12,12-dodecachloro-4a-methyl-
1,4,4a,5,8,8a,9a,10a-octahydro-1,4:5,8-
dimethanoanthrahydroquinone.
6. 1,2,3,4,4a,5,6,7,8,8a,11,11,12,12-tetradecachloro-
1,4,4a,5,8,8a,9a,10a-octahydro-1,4:5,8-
dimethanoanthrahydroquinone.
7. 1,2,3,4,5,6,7,8,11,11,12,12-dodecachloro-4a,8a-
dimethyl-1,4,4a,5,8,8a,9a,10a-octahydro-1,4:5,8-
dimethanoanthrahydroquinone.
8. 1,2,3,4,4a,5,6,7,8,9a,11,11,12,12-tetradecachloro-
1,4,4a,5,8,8a,9a,10a-octahydro-1,4:5,8-
dimethanoanthrahydroquinone.
9. 1,2,3,4,5,6,7,8,11,11,12,12-dodecachloro-4a,9a-
dimethyl-1,4,4a,5,8,8a,9a,10a-octahydro-1,4:5,8-
dimethanoanthrahydroquinone.
10. 1,2,3,4,4a,5,6,7,8,10a,11,11,12,12-tetradecachloro-
1,4,4a,5,8,8a,9a,10a-octahydro-1,4:5,8-
dimethanoanthrahydroquinone.
11. 1,2,3,4,5,6,7,8,11,11,12,12-dodecachloro-4a,10a-
dimethyl-1,4,4a,5,8,8a,9a,10a-octahydro-1,4:5,8-
dimethanoanthrahydroquinone.

References Cited by the Examiner

UNITED STATES PATENTS 2,584,139  2/1952  Lidov _____ 260—586
2,802,794  8/1957  Sprauer _____ 23—143
2,955,141  10/1960  Schmerling _____ 260—648

OTHER REFERENCES

Landazuri, "Chem. Abstracts," vol. 42, p. 7285f (1948).
Prill, "J. Am. Chem. Soc.," vol. 69, p. 62 (1947).
Roedig et al., Chemische Berichte, vol. 88 (1955), pp. 2003–2011.

LEON ZITVER, *Primary Examiner.*

M. B. ROBERTO, T. G. DILLAHUNTY,
*Assistant Examiners.*